Feb. 22, 1944.　　　　G. BAXTER　　　　2,342,523
BOMB CARRIER AND CONTROL FOR THE BOMBS
Filed Feb. 3, 1941　　　3 Sheets-Sheet 1
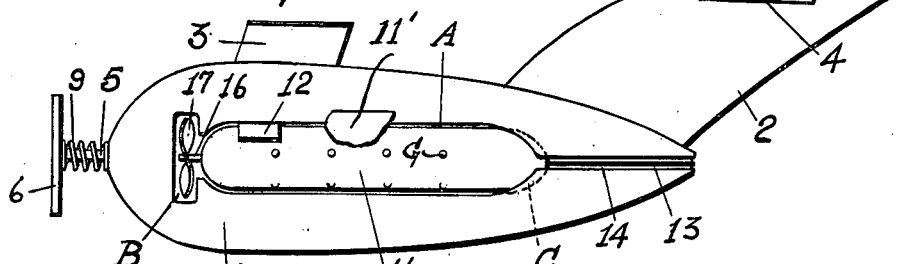
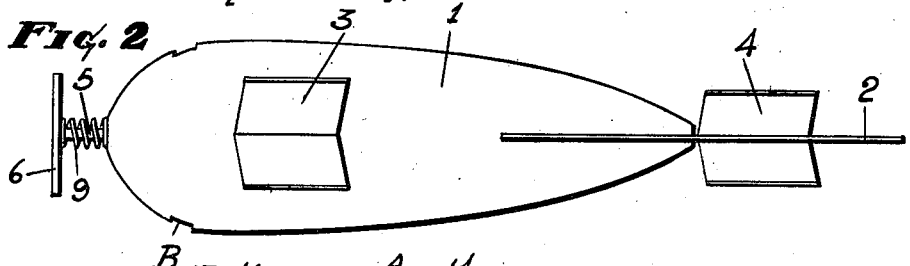
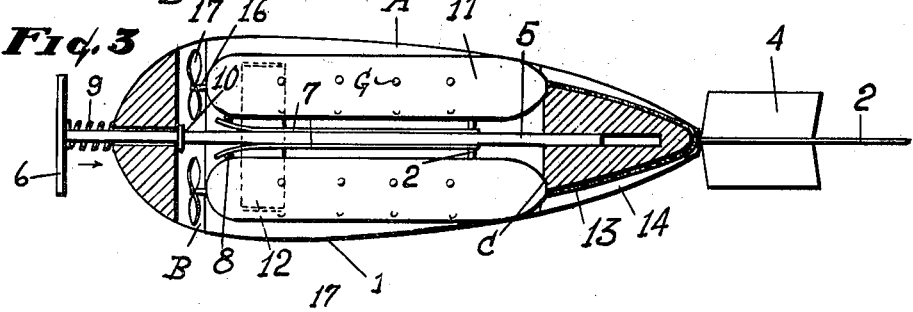
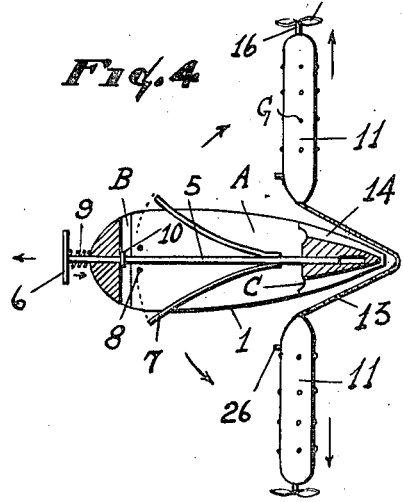
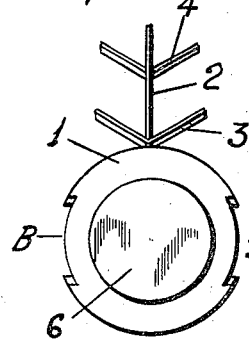
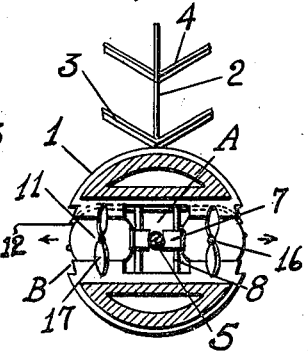
INVENTOR.
GEORGE BAXTER
BY U. G. Charles
ATTY.

Feb. 22, 1944.   G. BAXTER   2,342,523
BOMB CARRIER AND CONTROL FOR THE BOMBS
Filed Feb. 3, 1941   3 Sheets-Sheet 2
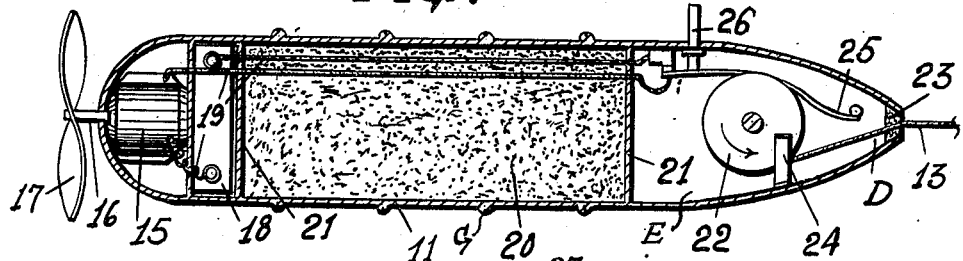
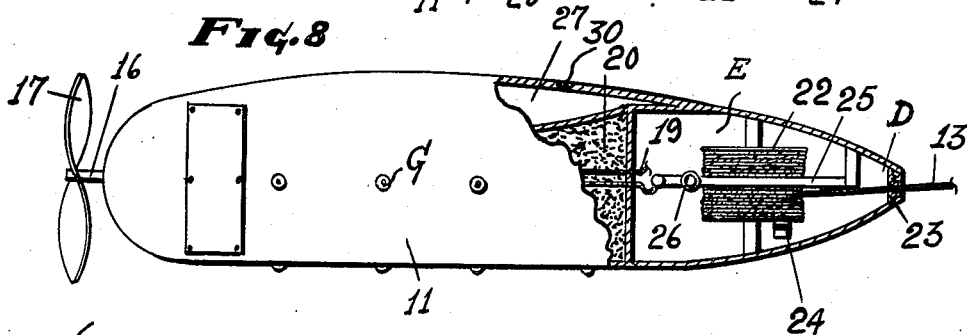
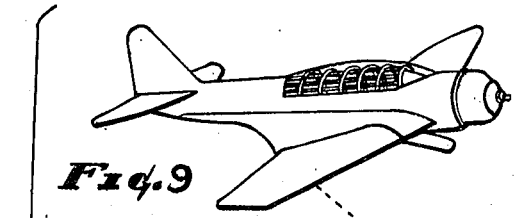
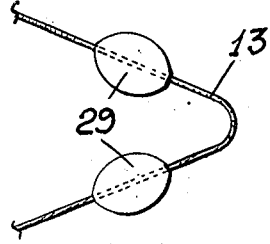
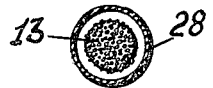
INVENTOR.
GEORGE BAXTER
BY
ATTY.

Feb. 22, 1944.  G. BAXTER  2,342,523
BOMB CARRIER AND CONTROL FOR THE BOMBS
Filed Feb. 3, 1941  3 Sheets-Sheet 3
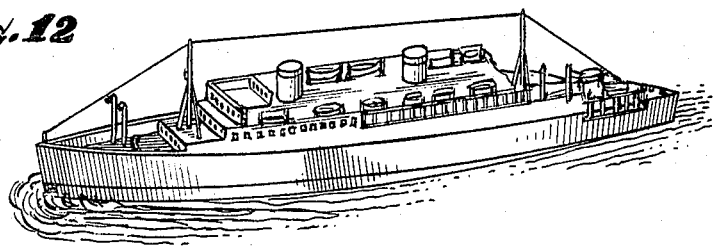
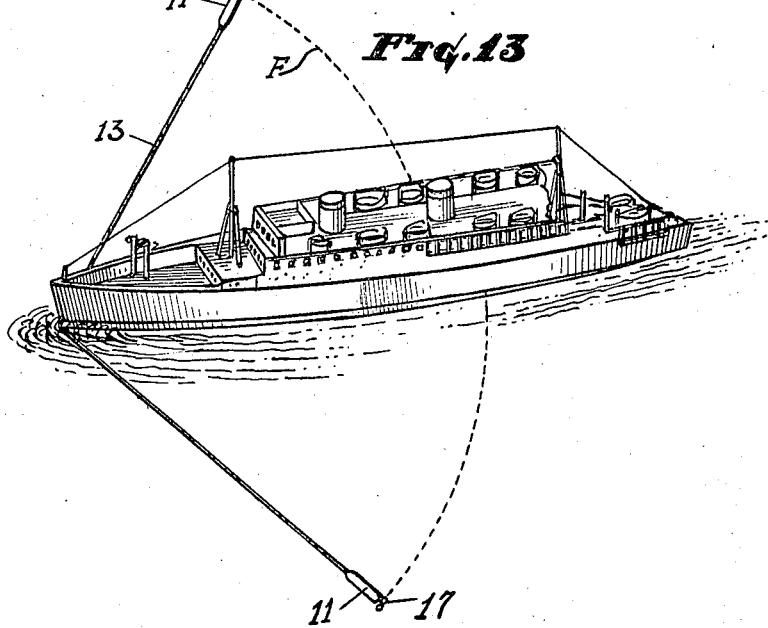
INVENTOR
George Baxter
BY Patented Feb. 22, 1944

2,342,523

UNITED STATES PATENT OFFICE 2,342,523

BOMB CARRIER AND CONTROL FOR THE BOMBS

George Baxter, Marion, Kans., assignor of five per cent to C. Hauser, five per cent to H. F. Murphy, five per cent to Jay E. Hargett, five per cent to Randolph Carpenter, five per cent to G. J. Goodsheller, five per cent to Ed Hauser, five per cent to Harold M. Hauser, five per cent to Bena Hannaford, five per cent to Clara Baxter, all of Marion, Kans., and five per cent to W. L. Riddle, Herington, Kans.

Application February 3, 1941, Serial No. 377,164

2 Claims. (Cl. 114—20)

My invention relates to a bomb carrier and control for the bombs for naval engagement, more particularly to the torpedo specie and adapted to be dropped from an aircraft, and has for one of its objects a means on the forward end of the carrier to release and discharge a pair of torpedoes detachably seated in said carrier.

A further object of this invention is to provide a carrier for a pair of torpedoes in such a way as to protect the same from force of contact as the carrier meets a water level, means to launch the torpedoes oppositely and headed from each other in their lines of travel at the instant of said contact, each torpedo having a propeller operatively positioned on the forward end thereof and power means to actuate the propeller, and means to exercise the power as the torpedoes leave the carrier, and the said torpedoes being connected at their rear ends by a cable to retain the same at a maximum spaced relation to cause their contact with the hull of an advancing battle ship when the cable is picked up by the bow thereof for a swinging movement of the torpedoes to contact with the hull of the battle ship to effect explosion of the torpedoes at the hull line.

A still further object of this invention is to provide a winding drum in the tail portion of a torpedo, and on which the cable will be wound, the winding being equal in each of a pair of torpedoes connected thereby, and the said cable may be of a buoyant nature or provided with buoyant elements secured thereto sufficient for shallow submergence to accommodate a pick up by the bow of an enemy ship for the desired result.

A still further object of this invention is to provide a stabilizing means for the carrier to maintain a horizontal starting position for the torpedoes as they leave the carrier, their line of travel from each other being transverse and to extend across the path of an approaching ship so that the cable of the torpedoes will be engaged by the ship.

A still further object of this invention is to provide a carrier for torpedoes placed therein and a fragile means to conceal the torpedoes from observation but free to burst therethrough when actuated by the ejecting springs, and the said carrier being disconnected is free to disappear without disturbing the torpedo action in setting the cable as a trap for the battle ship of an enemy.

These and other objects will hereinafter be more fully explained, reference being had to the accompanying drawings forming a part of this specification and in which like characters will apply to like parts in the different views.

Referring to the drawings:

Fig. 1 is a side view of the carrier.

Fig. 2 is a plan view of Fig. 1.

Fig. 3 is a sectional view of the character longitudinal thereof showing the torpedoes in plan view encased.

Fig. 4 is a similar view to that of Fig. 3 but reduced to illustrate the ejected position of the torpedoes from the carrier.

Fig. 5 is a front end view of the carrier.

Fig. 6 is a cross section taken on line 6—6 in Fig. 1.

Fig. 7 is a sectional view of a torpedo along the diametrical axis thereof.

Fig. 8 is a transverse view to that of Fig. 7, parts removed for convenience of illustration.

Fig. 9 is a perspective view of an airplane from which is discharged a torpedo carrier, the dotted travel line of the carrier being broken for convenience of illustration.

Fig. 10 is a plan view showing buoyant elements spaced along the cable.

Fig. 11 is a sectional view of a buoyant cable.

Fig. 12 is a perspective view of a battle ship approaching the connecting cable of torpedoes, the cable and torpedoes being a part of said view.

Fig. 13 is a perspective view showing the result of contact.

The invention herein disclosed consists of a carrying element 1, parabola in form and having an elongated opening A diametrically passing through the carrier, extending longitudinal thereof and terminating a spaced distance from each end of the carrier. The forward end of the carrier structure has a vertically disposed slot B transversely crossing its terminal end of opening A in which the propeller of torpedoes will extend. Upward and rearwardly extending from the tail of the carrier is a rudder 2 as a directional guide and stabilizer for a vertical position of the carrier in its descent from an aircraft from which said carrier is discharged, and the said carrier has a pair of fins 3 secured to the body a spaced distance rearward from the forward end thereof, said fins extending oppositely and obliquely upward from the vertical plane of the diametrical axis of the carrier body, said fins where they join the body are aligned with the range of the rudder, coacting therewith to maintain a forward or upright position of the carrier to avoid a vertical discharge of the torpedoes from the carrier. The said rudder adjacent its upper extremity has a fin 4 outwardly extending from each side thereof and being at right angle thereto to function as a vertical tension for likewise coaction with that of the first said fins.

Extending along the diametrical axis of the carrier is a shaft 5 adapted to slide longitudinally, terminating a spaced distance inward from the tail tip of the carrier and extending outward through the front end of the head of the carrier body, the outer end of which has a disc 6 axially secured thereto, for end thrust of the shaft at the moment of its contact with a body of water to discharge the torpedoes as follows. Secured to the shaft rearward thereof and extending forward is a pair of oppositely disposed leaf springs 7, the free ends of which are adapted to move oppositely outward, and from the said opening A as shown in Fig. 4 and may be retained in parallelism with the shaft by their free ends engaging with their respective pins 8 adjacent the forward end of said opening between said pins as shown in Fig. 3 and being released by a rearward movement of the shaft to which the spring are attached for an outward thrust of the springs. The said shaft being tensioned forward by a coil spring 9 wound on the shaft between the disc and forward extremity of the carrier to move and retain said shaft forward to insure an inward rocked position of the free ends of said leaf springs. Positioned on the shaft is a detent 10 to restrict the forward movement of the shaft. Positioned in the opening of the carrier is a pair of torpedoes 11, oppositely disposed with respect to the shaft and in parallelism; when so installed the opening being closed by a fragile substance 11' to conceal the torpedoes from view as a blind for the enemy, otherwise the carrier is disguised with respect to a bomb due to its stabilizing arrangement, each of said torpedoes being retained therein by a resilient anchor plate 12 extending across the opening and said torpedoes, the outer ends of the plate are curved downward to engage along the periphery of their respective torpedo adjacent the front ends thereof, while the other ends abut the rear end of the opening seating in a depression C, respectively, to retain said end portions in the carrier while the front ends of the torpedoes are being rocked outward by the springs as resiliently released by the plate. Stored in the rear of each torpedo is a cable 13, a portion extending outward therefrom and being looped around the tail portion of the carrier, seating in an appropriate groove 14 formed in the outer wall of said portion of the carrier and extending around the top as shown in Figs. 1, 3 and 4, to function as an anchor to retain the tail portion of each torpedo confronting each other at the time of their ejection from the opening as shown in Fig. 4; it being understood that the force of ejection is at the forward end of the torpedoes by leaf spring action heretofore described, and at the time of ejection, the propeller motors are set in action as conveying means for the torpedoes oppositely to lay the cable. To accomplish such an action it will be seen that the torpedo is equipped with a motor 15 in the front end thereof from which a shaft 16 outwardly extends and having a winged propeller 17 secured to the end of the shaft and being turned thereby to convey the torpedo, said motor being actuated by a battery 18 positioned rearward thereof and connected thereto by wires 19 appropriately arranged for the circuit required to drive the motor, and said wires extending rearward along a chamber containing the explosive 20 that is housed intermediate of the ends of the torpedo by heads 21. Positioned in the end of the torpedo rearward of the explosive is a cable drum 22 trunnioned therein and on which said cable is wound in equal proportion with respect to a pair of torpedoes. The said cable extends outward through an apertured dissolvable bushing 23 secured in the tip end D of a torpedo by which means the drum cavity E is sealed temporarily to avoid flooding of the cavity and the cable is adapted to slide freely through the aperture as the said torpedoes are conveyed outward from each other. The said drum has a frictional brake element 24 to engage on the end thereof to avoid excess unwinding and to tension the cable for the purpose later described, it being understood, that the end of the cable is secured to the drum to avoid its detachment from the torpedo. The motor duration is governed by a switch arm 25 that is resilient and rests upon the winds of the cable and adapted to move inward as the cable is unwound, by which means, the circuit is broken at a predetermined unwind of the cable to stop the motor. It will be seen that another circuit breaker for the current is through the medium of a pin 26 extending outward through the shell of a torpedo, the inner end of which seats on said switch arm adjacent its circuit closing point, the pin being pressed inward by its outer end coming in contact with the said shaft 4, or leaf spring attached thereto, when the torpedo is properly seated in the carrier by which means the circuit is broke by the pin engaging on said resilient arm 25 when moved inward, whose fulcrum point is on the winds of the cable to control the switch selectively. The said torpedo has an airpocket 27 on one side and extending therealong as buoyant means to carry the same in close proximity to the water surface or a short distance therebeneath, furthermore the cable may be buoyantly carried by a liquid tight insulation 28 loosely engaging as shown in Fig. 11, or said cable may be provided with a pair of buoyant elements 29 spaced apart from the center of the cable as shown in Fig. 10; being thus supported against deep submersion is means to insure its contact with the bow of the battle ship which in turn, as the ship advances, the torpedoes are swung to engagement with the hull of the ship to cause explosion as the torpedoes have a series of protrusions G distributed thereon and being charged in the usual manner to ignite by concussion. In Figure 12 is shown the portion of the torpedoes and cable connecting the same confronted by an approaching battle ship, while Fig. 13 illustrates the result of contact with the cable causing the torpedoes to swing toward the sides of the battleship as shown by dotted lines F for the desired result.

The contact of the cable by the ship appears to be centrally disposed but not so required as an eccentric contact will cause engagement of at least one torpedo if not both unequally engaged with the sides of the ship and with the desired result.

It will now be seen in the course of engagement the torpedoes or other like explosive elements are deposited in the voyaging path of a battle ship through the medium of a bombing aircraft shown in Fig. 9 arranged to cast the carrier in the sea for the purpose herein described, and the principle is especially adapted to deep sea engagement, as the said torpedoes and connecting cable have the capacity of buoyancy and may be timed for a period of endurance, the time expiration is due to a dissolvable plug 30 sealing the air chamber and bushing 23 sealing the drum chamber, when said elements are dissolved their respective chambers will in turn lose their buoyancy whereupon the torpedo will sink.

While I have shown and described a specific form of carrier, and means to discharge torpedoes from the carrier, I do not wish to be restricted to such form and discharging means, as each may be varied or modified without departing from the spirit of the invention; furthermore, the cable carrying means at the tail of the torpedo and electric switch relating thereto may be revised or modified to conform to the structure of the torpedo to accommodate such convenience. Also the torpedo as a whole may be revised to embody the motive power and features above referred to.

It will also be understood that pairs of torpedoes having cable connection may be cast from a sea-going vessel with equal efficiency, either by a mechanical structure or manually launched, and such other modifications may be employed as lie within the scope of the appended claims.

Having fully described the invention as disclosed in the drawings and with respect to the modifications enumerated what I claim as new and desire to secure by Letters Patent is:

1. In a device to be discharged from an aircraft, a carrier of an appropriate length, and a pair of torpedoes in parallelism within the carrier, seating in an opening in the carrier diametrically opposite each other, a shaft axially extending into and partially through the carrier from end to end, one end of the shaft extending outward in a set position, said shaft adapted to slide in the carrier longitudinally, a disc on the outer end of said shaft as a contact element to slide the shaft inward, spring means to retain the shaft in its set position, and a detent to restrict the shaft in its outward movement, one end of each torpedo seating in a depression as retaining means therefor, the other end of each torpedo having a propeller, a resilient means secured to the carrier to retain last said ends of the torpedoes in the opening, each of the first said ends having a cable drum rotatably carried therein, a buoyant cable of an appropriate length entering said end of the torpedo axially thereof, and having an equal portion from each end of the cable wound on its respective torpedo drum, a pair of leaf springs having their corresponding ends secured to the shaft diametrically opposite each other and adapted to rock the torpedoes from the carrier at their propeller ends as releasing means and closing means for the circuit of an electric motor positioned in each torpedo as actuating means for their propellers whereby said torpedoes are conveyed oppositely while the cable unwinds from each to be picked up by the bow of a ship to swing the torpedoes in contact with the body of the ship.

2. In a carrier for torpedoes conveyed by an aircraft, of the class described, the carrier being stream-lined in form, having an opening therethrough that crosses the diametrical axis of the body, and terminating a spaced distance from each end of the body, one terminal end having depressions in the body portion in which to retain their corresponding ends of torpedoes, means adjacent the other end of the opening to retain the other ends of the torpedoes, a leaf spring to rock the last named end of each torpedo outward from the opening, a shaft axially extending through the body of the carrier longitudinally thereof, the shaft extending outward from one end and having a disc positioned thereon to move the shaft inward at the contact movement of the disc with water surface, means in the body to retain the leaf springs in parallelism with the shaft and in close relation to the shaft, said leaf springs being carried by the shaft and released to rock the torpedoes outward as above stated when the shaft is moved inward, all substantially as shown.

GEORGE BAXTER.